US008179879B2

(12) United States Patent
Ivry

(10) Patent No.: US 8,179,879 B2
(45) Date of Patent: May 15, 2012

(54) ROBUST RANGING METHOD

(75) Inventor: Raanan Ivry, Haifa (IL)

(73) Assignee: PMC-Sierra Israel Ltd., Herzliya Pituach (IL)

(*) Notice: Subject to any disclaimer, the term of this patent is extended or adjusted under 35 U.S.C. 154(b) by 499 days.

(21) Appl. No.: 11/856,735

(22) Filed: Sep. 18, 2007

(65) Prior Publication Data

US 2008/0069562 A1    Mar. 20, 2008

Related U.S. Application Data

(60) Provisional application No. 60/825,931, filed on Sep. 18, 2006.

(51) Int. Cl.
    *H04J 3/06* (2006.01)
(52) U.S. Cl. ........................... 370/350; 370/242
(58) Field of Classification Search .................. 370/242, 370/458, 321, 324, 337, 347, 442, 350
    See application file for complete search history.

(56) References Cited

U.S. PATENT DOCUMENTS

| 4,845,735 | A |   | 7/1989  | Payne et al.    |         |
|-----------|---|---|---------|-----------------|---------|
| 5,043,982 | A |   | 8/1991  | Werner          |         |
| 5,379,299 | A |   | 1/1995  | Schwartz        |         |
| 5,621,773 | A | * | 4/1997  | Varma et al.    | 375/368 |
| 5,802,061 | A |   | 9/1998  | Agarwal         |         |
| 5,850,525 | A |   | 12/1998 | Kalkunte et al. |         |
| 6,215,792 | B1|   | 4/2001  | Abi-Nassif      |         |
| 6,768,730 | B1|   | 7/2004  | Whitehill       |         |
| 6,853,624 | B2|   | 2/2005  | Cho et al.      |         |
| 6,948,184 | B1|   | 9/2005  | Del Sol et al.  |         |
| 6,980,561 | B1| * | 12/2005 | Abi-Nassif      | 370/458 |
| 7,016,355 | B1|   | 3/2006  | Graf et al.     |         |
| 7,120,847 | B2| * | 10/2006 | Kostoff et al.  | 714/748 |
| 7,251,240 | B2|   | 7/2007  | Jang            |         |
| 7,583,898 | B1| * | 9/2009  | Dalton et al.   | 398/100 |
| 7,616,679 | B2| * | 11/2009 | Choi et al.     | 375/147 |

OTHER PUBLICATIONS

ITU-T,G.984.3, Feb. 2004,Gigabit-capable Passive Optical Networks (G-PON): Transmission convergence layer specification, Series G: Transmission systems and media, Digital systems and networks, p. 30-31 and41.*
ITU-T,G.984.3, Feb. 2004, Gigabit-capable Passive Optical Networks (G-PON):Transmission convergence layer specification, Series G: Transmission system and media, Digital system and networks, p. 30-31 and 41.*
802.3™"*Part 3: Carrier sense multiple access with collision detection (CSMA/CD) access method and physical layer specifications*" IEEE Computer Society. Dec. 2005.
"*Part 3: Carrier sense multiple access with collision detection (CSMA/CD) access method and physical layer specifications*" Section Two IEEE Computer Society. Dec. 2005.

(Continued)

*Primary Examiner* — Derrick Ferris
*Assistant Examiner* — Maharishi Khirodhar
(74) *Attorney, Agent, or Firm* — Mark M. Friedman

(57) ABSTRACT

In a communication system in which data is transferred by packets, a ranging method in which a receiver, in a given ranging window, periodically compares received data with expected data to find a match. The periodic comparison includes searching for known preamble and/or delimiter sequences of ranging packets and involves timeouts for each search period. In case a match between the known sequences and received sequences is not found and the respective timeout is exceeded, the search and comparison process is restarted and continues until a global timeout is exceeded.

1 Claim, 9 Drawing Sheets

OTHER PUBLICATIONS

"*Part 3: Carrier sense multiple access with collision detection (CSMA/CD) access method and physical layer specifications*" Section Three IEEE Computer Society Dec. 2005.

"*Part 3: Carrier sense multiple access with collision detection (CSMA/CD) access method and physical layer specifications*" Section Four IEEE Computer Society Dec. 2005.

"*Part 3: Carrier sense multiple access with collision detection (CSMA/CD) access method and physical layer specifications*" Section Five. IEEE Computer Society. Dec. 2005.

"*Gigibit-capable Passive Optical Networks (G-PON): General characteristics*" International Telecommuication Union G.984.1, Mar. 2003.

"*Gigibit-capable Passive Optical Networks (G-PON): Physical media Dependent (PMD) layer specification*" International Telecommuication Union G.984.2, Mar. 2003.

"*Gigibit-capable Passive Optical Networks (G-PON): Transmission convergence layer specification*" International Telecommuication Union G.984.3, Mar. 2003.

\* cited by examiner

ROBUST RANGING METHOD

CROSS REFERENCE TO RELATED APPLICATIONS

The present invention claims priority from U.S. Provisional Patent Application No. 60/825,931 filed Sep. 18, 2006, the content of which is incorporated herein by reference in its entirety.

FIELD OF THE INVENTION

The present invention refers in general to Time Division Multiple Access (TDMA) communications and in particular to Ranging used in TDMA communications Acronyms AFE—Analog Front End. The AFE consists of a transceiver, a trans-impedance amplifier, a limiter amplifier and Clock Data Recovery (CDR) component.

OLT—Optical Line Termination

ONU—Optical Network Unit

MAC–Medium Access Control

TDMA—Time Division Multiple Access

CDR—Clock and Data Recovery

TO—Time Out

AGC—Automatic Gain Control

BACKGROUND OF THE INVENTION

Modern TDMA communication systems are known in a variety of configurations. FIG. 1A shows a typical point to multi-point communication system in which a receiver 102 (see also FIG. 3) communicates bi-directionally with a plurality of users 104-1 to 104-N. FIG. 1B shows data packets (in order of users 1, 2, 3 . . . N) arriving in order at the receiver. FIG. 2 shows schematically a particular, passive optical network (PON) communication system, in which the receiver is represented by an OLT 202 and the users are represented by ONUs 204-1 to 204-N. The PON may be of any known type, for example a Gigabit-capable Passive Optical Network (GPON) or Ethernet-capable Passive Optical Network (EPON)

A typical receiver 300 is shown in FIG. 3. The receiver can both transmit and receive. It includes an AFE (receiving analog front end) component 302, a CDR (receiving clock and data recovery) component 304 a logic unit (MAC) 306 and a transmitter TX 308, interconnected as shown. AFE 302 amplifies the low power data in the receive side. A first control signal (Reset AFE) 310 is supplied by the logic unit to assist the AFE in its functions, This Reset AFE signal assists the AFE to tune to the incoming data. The CDR locks to the input data. It acquires the frequency and the phase of an input data 312 signal and outputs a digital Received Data signal 314, synchronized with a Received Clock signal 315, to the logic unit. A second control signal (Reset CDR) 316 is supplied by the logic unit to assist the CDR in its functions. This Reset CDR signal assists the CDR to fast lock (frequency and phase) to the input data. The logic unit performs all the processing and controls the Ranging processes (explained below).

Ranging is performed in multi-user networks, in which the packet arrival time should be accurate and much smaller than the propagation delay. In general, in such networks, the Ranging targets include detection of a new user, synchronization of the receiver with the incoming bit stream of the new user; and estimation of the propagation delay (or round trip delay) of the new user. After the Ranging process is successfully finished, the arrival time of the new user's packet is known to the receiving system, and receiving from the new user can be accurately initiated by the receiver.

FIG. 4 shows a typical situation when a ranging window is allocated for a new user to join the network. A ranging window is a period of time in which all the new users can try and join to the network (in order not to collide with other users during Steady State operation, defined as the operation mode after successful completion of Ranging. The packets of different users may have different propagation delays (or round trip delays). In order to prevent contentions, the receiver must synchronize the different users. Before Ranging, the start of packet arrival time from the new user is unknown to the receiver. Although it is performed only when a new user joins the network, Ranging is a difficult task and needs to be carefully addressed. Various Ranging methods (or "processes") are exemplarily described in U.S. Pat. Nos. 6,980,561, 6,948,184, 6,768,730, 6,215,792, 5,802,061, 7,251,240, 7,016,355, 6,853,624, 5,850,525, 5,379,299, 5,043,982 and 4,845,735, all incorporated herein by reference in their entirety.

FIG. 5 shows a common packet structure, as known in the art. A packet includes, in order, a Guard Time section 502, a Preamble section 504, a Delimiter section 506 and a Payload section 508. The Guard Time, Preamble and Delimiter sections are sometimes named "Header". The Guard Time is a time period in which no energy is transmitted. The Preamble (or synchronization sequence) is a sequence of zeros and ones. The sequence should consist of a lot of transitions to help the CDR to lock. The Delimiter is a sequence of bits which must be different from the Preamble. Its main use is to assist in detecting the beginning of the Payload. The structure of the Header is defined to enable the clock recovery to lock on the right timing.

FIG. 6 shows a straightforward, prior art Ranging method, typical of those indicated in the abovementioned references. At the beginning of a ranging window, the receiver activates the AFE and starts looking for a Preamble and Delimiter of a Ranging Packet until it finds both. In the Ranging process, since the arrival time is not known, the Header is larger than in Steady State, in which the Header should be as small as possible. This is possible since the arrival time is known to the receiver. The straightforward Ranging process has no periodicity in it—it occurs once. The process is finalized (ends) when the Delimiter is found and the receiver starts receiving the data correctly. This straightforward method assumes that the AFE does not require special control signals synchronized with the incoming data, which is usually the case.

To summarize, this kind of Ranging is limited to only few cases and it can be used only:

1. when the AFE and the CDR can detect data without external control signals (usually with special timing requirements (the AFE and the Burst Mode CDR sometimes require that the control signals should be activated during the preamble reception)
2. when the AFE blocks the data when the signal is low (squelch). Otherwise, false alarm reception can mislead the Logic Unit. This requirement requires special hardware in the AFE, the CDR or both components.

The main drawback of this method appears when there is a chance of false alarms or when one of the above conditions is not fulfilled. If there is a false alarm, there is no second chance, the burst is not received and the Ranging needs to start again. Moreover, some types of receivers must be activated during the reception of data, so the above Ranging method can not work at all.

Usually, to enable the Ranging process, special hardware building blocks such as a Fast Power Detection flag, a Fast AGC (Automatic Gain Control), etc., are built in the front end of the system. These building blocks are expensive and suffer from limited performance in terms of probability of detection versus false alarms. They also require expensive calibration. Moreover, most communication receivers, for example Burst Mode optical receivers (optical receivers that are intended for burst operation) or Burst Mode CDRs require a reset signal to start a proper receiving operation. This reset is possible only after the Ranging process since the packet arrival time must be known to the receiver. Furthermore, in a noisy environment, the false alarm rate increases, which sometimes makes Ranging (using such hardware block) impossible.

Accordingly, there is a need for, and it would be advantageous to have a robust Ranging method, which requires no additional hardware for its implementation (except for the ability to receive data), and which can always guarantee successful Ranging.

SUMMARY OF THE INVENTION

The present invention discloses a "periodic" Ranging method that enables use of simple and inexpensive AFE and CDR components. Its special inventive aspect of "periodicity" is explained in detail below. In particular, a receiver periodically supplies control signals to both the AFE and the CDR, although the arrival time of a new packet is not known to the receiver. The logic unit (MAC) receives a sequence of bits from the CDR (which can be meaningless if the control signals are not in the right place) and compares it with an expected (i.e. known) Preamble. In case such a Preamble is not detected within the first timeout, the search process repeats (AFE and CDR activation, looking for the Preamble). If the Preamble is detected, the receiver searches for a delimiter. If the Delimiter is detected within the second timeout, the Ranging process is done. If not, the receiver starts looking for the Preamble again, etc. This periodic or "cyclic" process continues until both the Preamble and the Delimiter are detected or until a global timeout (preferably different than the first two) is exceeded. After the Delimiter is detected, the arrival time of the packet is known and propagation delay estimation can be performed.

According to the present invention there is provided a ranging method comprising the steps of: after start of a ranging window, periodically comparing received data with expected data to find a match therebetween; in case of a match failure, restarting the comparison within the same ranging window until a match is found; and if a match is found, moving to a steady state operation regime.

In some embodiments, the step of periodically comparing received data with expected data includes searching an incoming data stream for a known packet preamble until the preamble is found or until a first timeout is exceeded, whereby the exceeding of the first timeout represents a first match failure.

In some embodiments, the step of periodically comparing received data with expected data includes searching an incoming data stream for a known packet delimiter until the delimiter is found or until a second timeout is exceeded, whereby the exceeding of the second timeout represents a second match failure.

In some embodiments, if the preamble is found, the step of periodically comparing received data with expected data further includes searching the incoming data stream for a known packet delimiter until the delimiter is found or until a second timeout is exceeded, whereby the exceeding of the second timeout represents a second match failure.

In some embodiments, the step of periodically comparing ends in a match failure and the step of restarting includes restarting the comparing until a global timeout is exceeded.

In some embodiments, the step of restarting includes activating an analog front end unit of the receiver.

In some embodiments, the global timeout equals a ranging window.

According to the present invention there is provided a ranging method comprising the steps of: after start of a ranging window, searching for a ranging packet section until the ranging packet section is found or until a respective timeout is exceeded; if the packet section is not found or if the respective timeout is exceeded, checking if a global timeout TO3 is exceeded and if not; repeating the steps of searching and checking within the same ranging window until global timeout TO3 is exceeded.

In some embodiments, the method further comprises the step of: if the packet section is found in the step of searching, moving to a steady state operation regime.

According to the present invention there is provided a ranging method comprising the steps of: starting a ranging window, and, within the same ranging window, performing an iterative search and comparison process on incoming packet data, the iterative process involving a ranging packet, until at least one ranging packet section is matched with at least one received packet data section or until a global timeout TO3 is exceeded.

In some embodiments, the step of performing an iterative search and comparison process includes using a respective timeout at an intermediate stage of the ranging window if a match is not found between the at least one ranging packet section and at least one received packet data section in that intermediate stage.

BRIEF DESCRIPTION OF THE DRAWINGS

The invention is herein described, by way of example only, with reference to the accompanying drawings, wherein.

DETAILED DESCRIPTION OF THE INVENTION

Figure 1A:
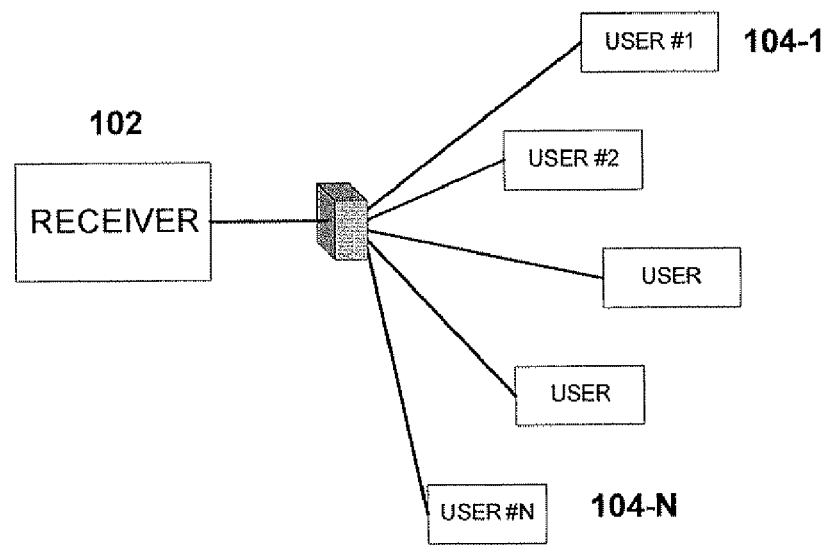
FIG. 1A shows schematically a typical, known, point to multi-point communication system.
Figure 1B:
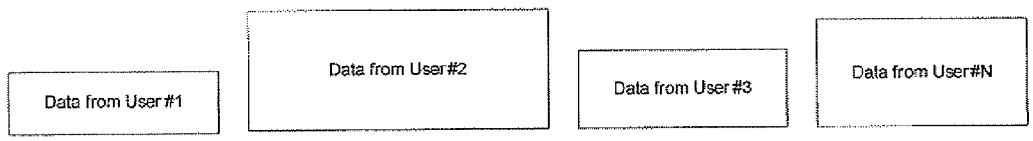
FIG. 1B shows data packets arriving in order at the receiver of FIG. 1A.
Figure 2:
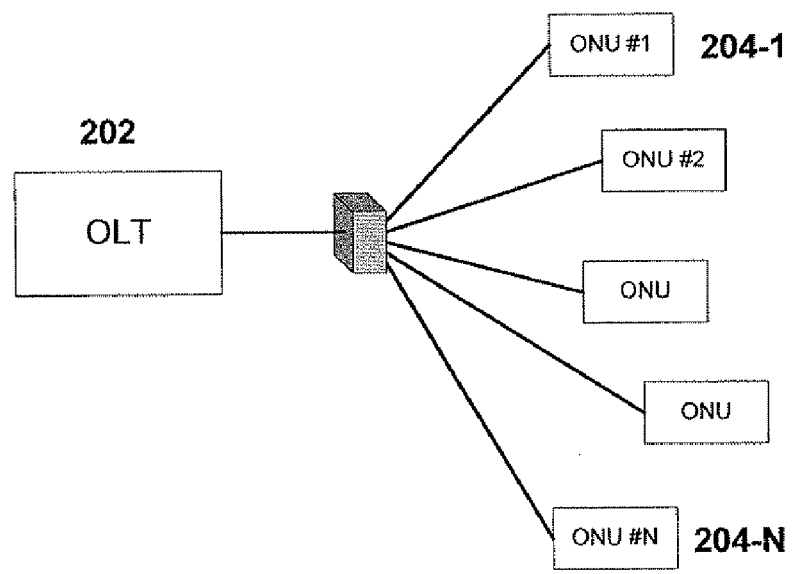
FIG. 2 shows schematically a typical, known, passive optical network (PON) communication system.
Figure 3:
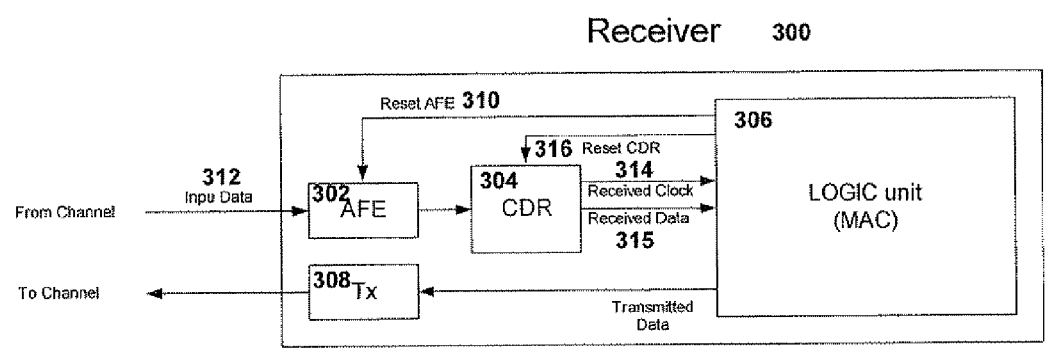
FIG. 3 shows a typical receiver unit used in a system as that of FIG. 1.
Figure 4:
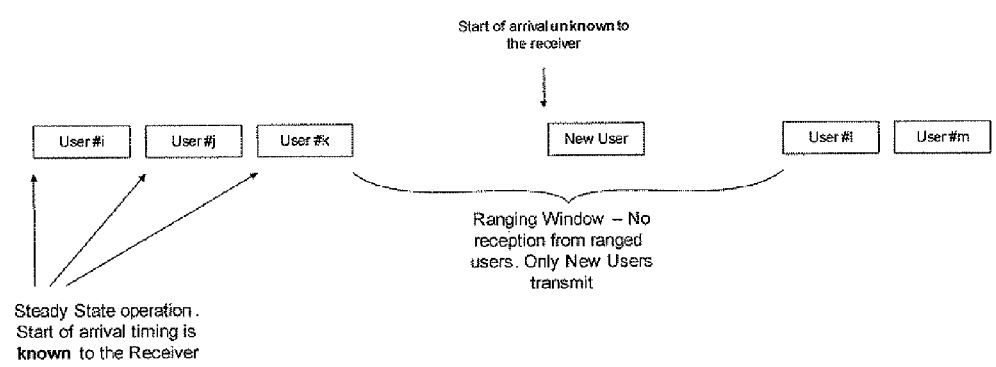
FIG. 4 shows a typical situation when a Ranging window is allocated for a new user to join the network.
Figure 5:
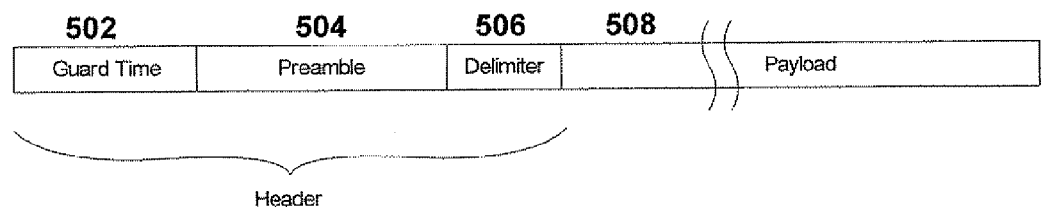
FIG. 5 shows a commonly known packet structure.
Figure 6:
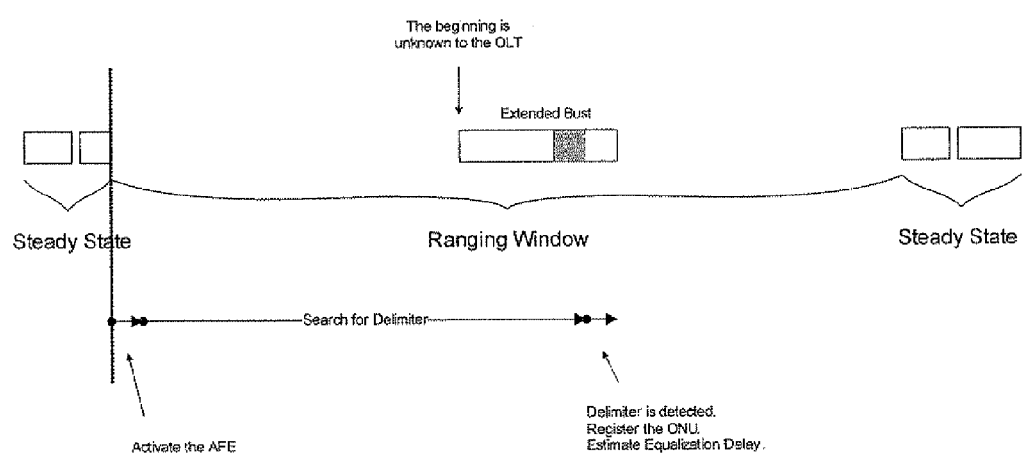
FIG. 6 shows a typical existing Ranging method.

The present invention discloses a robust, periodic Ranging method, which requires no additional hardware for its implementation (except for the ability to receive data), and which can always guarantee successful Ranging. A preferred embodiment of the Ranging method of the present invention is described with reference to the flow chart shown. Each new user who wants to join the network transmits a Ranging packet (in the ranging window), which consists of a Header and a Payload (described in FIG. 5). After the start of a ranging window in step 702, the MAC optionally activates the AFE (i.e. sends the required control signals Reset AFE 310 and Reset CDR 316 to) in step 704, and optionally searches for a Preamble (step 706) of the Ranging packet. The "optional" term means that AFE activation may not be needed for some types of AFEs, or that the search for a Preamble is skipped. If no Preamble is found in a check step 708 or if a first timeout period TO1 is exceeded, the AFE checks if a "global" timeout TO3 is exceeded in step 709, and if NO, the process returns to step 704. If YES in step 709, the Ranging process is stopped (being unsuccessful). If a Preamble sequence is found in step 708, the AFE starts looking for a Delimiter of the Ranging packet in step 710. Ranging packet data (such as the abovementioned Preamble and Delimiter) is also referred to herein as "expected data". If no Delimiter is found in a check step 712 or if a second timeout period TO2 is exceeded, the AFE checks if TO3 is exceeded in step 713, and if NO, the process returns to step 704. If YES in step 713, the Ranging process is also stopped (being unsuccessful). If a Delimiter is detected in step 712, the MAC receives the data, registers the user and estimates the user's propagation delay (to the receiver). In both cases of failure (YES) in steps 709 and 713, the ranging process needs to be restarted from step 702 in the next ranging window.

In an exemplary case, the Ranging packet is set as follows.
  Guard time: 32 bits.
  Preamble: 600 bits.
  Delimiter: 20 bits.
  TO1: 200 bits
  TO2: 250 bits
  TO3: Equal to the size of the ranging window.

Figure 8:
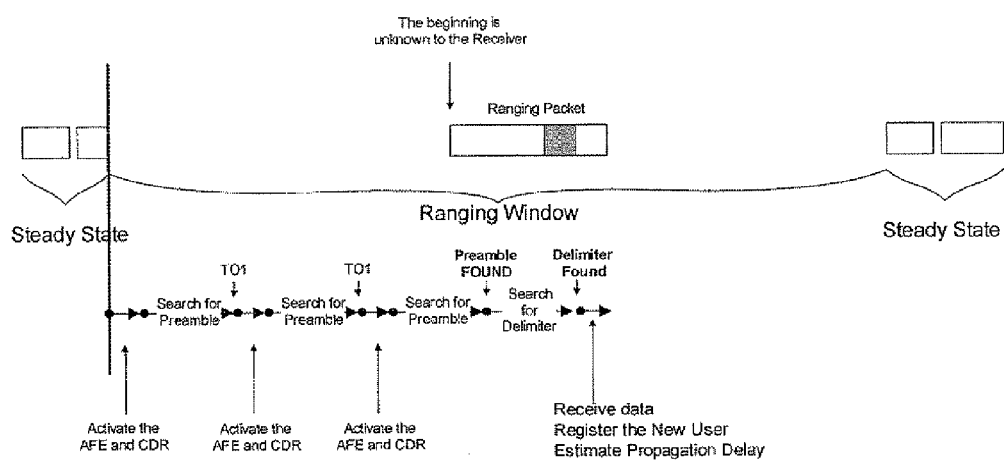
FIG. 8 shows an exemplary propagation delay determination process following the method of FIG. 7.

FIG. 8 shows schematically an exemplary Ranging process. Since the arrival time of the Ranging packet is not known to the receiver, the receiver starts operating according to the Ranging method disclosed herein. First, it activates its AFE and start searching for a Preamble. In the figure, the Ranging packet of the single new user is shown as not having been found (not arrived) in a period up to TO1. Therefore, after TO1, the process is repeated for a second time, in which the Ranging packet is still not found. Therefore, after another TO1, the process is repeated for a third time. In this third "round" (still in the same ranging window) a Preamble of the ranging packet is found, so the receiver looks for a Delimiter. The Delimiter which follows the Preamble is found, so the ranging process ends successfully: the receiver can correctly receive the data, the user can register to the network and the propagation delay can be estimated.

Figure 7:
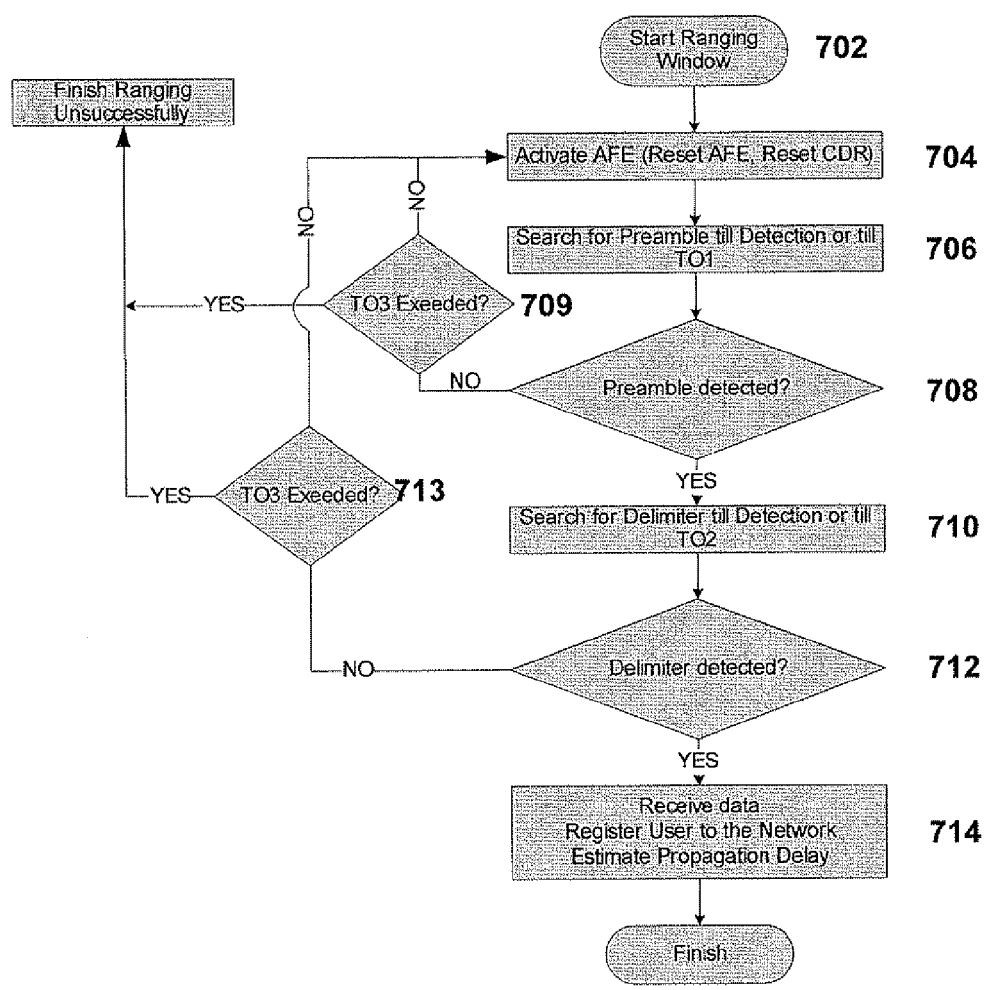
FIG. 7 shows a flow chart of a preferred embodiment of the Ranging method of the present invention.

The process described above and clearly illustrated in FIGS. 7 and 8 is "iterative", in a cyclical or "repetitive" sense. In contrast with prior art processes, which start once per ranging window, the process here repeats itself in a ranging window if a match between expected data and received data is not found. The iterative (repetitive) process in a ranging window ends only if the match is found or if predetermined timeouts are exceeded.

After the process described in FIG. 8 is done, the propagation delay determination can follow (i.e. the receiver or the user can calculate the difference between the sending time at the user and the arrival time). After this point, the Ranging process is done and both the receiver and the user are now in a Steady State mode or regime of operation. In steady state operation (after the propagation delay is known to the system), the arrival time of each packet is known to the system. For this reason the logic unit can supply control signals (i.e. Reset AFE 310 and Reset CDR 316) to both the AFE and to the CDR exactly when required (usually at the beginning of data packet). Note that these control signals can not be supplied with exact timing when in Ranging mode, because of the unknown propagation delay.

In summary, the method described herein enables to range and find the propagation delay with almost any existing system and AFE. No dedicated expensive hardware is required for the Ranging. The main idea is periodic trial and error. The receiver activates its AFE and CDR and searches for a special sequence (a Preamble and Delimiter). If it does not find such a sequence, the process (AFE activation and search) periodically start from the beginning. This process ends when finding the delimiter or after TO3 (unsuccessful). The method, by tuning certain parameters, can meet the requirement of almost any known AFE. It also proved itself as a very robust method in a noisy environment.

The disclosed ranging method requires cheaper and easier to implement AFE and CDR components. It is also more robust in case of noisy channels, when a high BER (Bit Error Rate) is expected.

All patents mentioned in this specification are incorporated herein in their entirety by reference into the specification, to the same extent as if each individual patent was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. In particular, the Ranging process disclosed herein may work without step 704 (activate AFE) in cases where the AFE does not require activation (as there are different kinds of AFE). It may also work without step 706, directly searching for a Delimiter.

What is claimed is:

1. In a passive optical network in which data is transferred by packets, a ranging method comprising the steps of: by an optical line terminal:
  a. After start of a ranging window, periodically comparing received data with expected data to find a match therebetween, by steps including:
    i. searching an incoming data stream for a known packet preamble until the preamble is found or until a first timeout is exceeded, wherein the exceeding of the first timeout represents a first match failure, and
    ii. if the preamble is found, searching the incoming data stream for a known packet delimiter until the delimiter is found or until a second timeout is exceeded, wherein the exceeding of the second timeout represents a second match failure;
  b. in case of a match failure, restarting the comparison within the same ranging window until a match is found; and
  c. if a match is found, moving to a steady state operation regime;
wherein the step of periodically comparing ends in a match failure and wherein the step of restarting includes restarting the comparing until a global timeout is exceeded.

* * * * *